US012683067B2

(12) United States Patent
Guo et al.

(10) Patent No.: US 12,683,067 B2
(45) Date of Patent: Jul. 14, 2026

(54) MULTILAYER COIL COMPONENT

(71) Applicant: TDK CORPORATION, Tokyo (JP)

(72) Inventors: Xuran Guo, Tokyo (JP); Kazuya Tobita, Tokyo (JP); Youichi Kazuta, Tokyo (JP); Yuichi Takubo, Tokyo (JP); Yuto Shiga, Tokyo (JP); So Kobayashi, Tokyo (JP); Toshinori Matsuura, Tokyo (JP); Noriaki Hamachi, Tokyo (JP); Junichiro Urabe, Tokyo (JP); Shunya Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 812 days.

(21) Appl. No.: 18/087,138

(22) Filed: Dec. 22, 2022

(65) Prior Publication Data

US 2023/0290561 A1 Sep. 14, 2023

(30) Foreign Application Priority Data

Mar. 14, 2022 (JP) ................................ 2022-039373
Nov. 16, 2022 (JP) ................................ 2022-183186

(51) Int. Cl.
*H01F 27/29* (2006.01)
*H01F 27/28* (2006.01)

(52) U.S. Cl.
CPC ....... *H01F 27/292* (2013.01); *H01F 27/2804* (2013.01); *H01F 2027/2809* (2013.01)

(58) Field of Classification Search
CPC ......... H01F 27/2804; H01F 2027/2809; H01F 17/0006; H01F 17/0013; H01F 5/003; H01F 27/29; H01F 27/292
USPC .................................................. 336/200, 232
See application file for complete search history.

(56) References Cited

U.S. PATENT DOCUMENTS

2016/0027578 A1* 1/2016 Nishino ................ H01F 41/041 335/297
2020/0281078 A1* 9/2020 Takahashi ........... H01F 17/0013
2021/0098181 A1* 4/2021 Araki ...................... H01F 17/04

FOREIGN PATENT DOCUMENTS

JP 2019-016642 A 1/2019

* cited by examiner

*Primary Examiner* — Tszfung J Chan
(74) *Attorney, Agent, or Firm* — Oliff PLC

(57) ABSTRACT

A multilayer coil component includes an element body including a main surface, first and second external electrodes disposed on the main surface, a coil disposed in the element body, a first connection conductor connecting the first external electrode and the coil, and a second connection conductor connecting the second external electrode and the coil. The second connection conductor includes a pad conductor and a through-hole conductor. The pad conductor and through-hole conductor are separated from the coil. The through-hole conductor includes a connection end connected to the pad conductor. The pad conductor includes a first portion overlapping the entire connection end included in the through-hole conductor and a second portion continuous with the first portion. The second portion is separated from the coil more than the first portion.

20 Claims, 6 Drawing Sheets

MULTILAYER COIL COMPONENT

BACKGROUND OF THE INVENTION

1. Field of the Invention

The present disclosure relates to a multilayer coil component.

2. Description of Related Art

Known multilayer coil components include an element body, a first external electrode, a second external electrode, a coil, a first connection conductor, and a second connection conductor (see, for example, Japanese Unexamined Patent Publication No. 2019-16642). The element body includes a main surface that is arranged to constitute a mounting surface. The first external electrode and the second external electrode are disposed on the main surface and separate from each other. The coil is disposed in the element body to have a coil axis along a direction intersecting the main surface. The coil includes a first end and a second end that is separated from the main surface more than the first end. The first connection conductor connects the first external electrode and the first end. The second connection conductor connects the second external electrode and the second end.

SUMMARY OF THE INVENTION

One aspect of the present disclosure provides a multilayer coil component in which self-resonant frequency can be controlled.

A multilayer coil component according to one aspect of the present disclosure includes an element body, a first external electrode, a second external electrode, a coil, a first connection conductor, and a second connection conductor. The element body includes a main surface that is arranged to constitute a mounting surface. The first external electrode and the second external electrode are disposed on the main surface and separated from each other. The coil is disposed in the element body to have a coil axis along a direction intersecting the main surface, and includes a first end and a second end that is separated from the main surface more than the first end. The first connection conductor connects the first external electrode and the first end. The second connection conductor connects the second external electrode and the second end. The second connection conductor includes a plurality of pad conductors and a plurality of through-hole conductors that are alternately disposed in a direction crossing the main surface and separated from the coil. Each of the plurality of through-hole conductors includes a connection end connected to an adjacent pad conductor among the plurality of pad conductors. Each of the plurality of pad conductors includes a first portion and a second portion continuous with the first portion. The first portion overlaps the entire connection end included in an adjacent through-hole conductor among the plurality of through-hole conductors. The second portion is separated from the coil more than the first portion.

In the one aspect described above, an interval between each of the plurality of pad conductors and the coil is easily adjusted with a form of each second portion. Stray capacitance between the plurality of pad conductors and the coil is adjusted. Therefore, in the one aspect described above, self-resonant frequency can be controlled.

In the one aspect described above, the second portion may be formed to extend from the first portion in a direction in which a distance between the second portion and the coil does not decrease.

In a configuration in which the second portion is formed as described above, the stray capacitance between the pad conductor and the coil can be adjusted with the direction in which the second portion extends.

In the one aspect described above, a distance between the coil and the second portion at a position away from the first portion may be larger than a distance between the coil and the second portion at a position close to the first portion.

In the one aspect described above, the distance between the coil and the second portion may increase with increasing a distance from the first portion.

In a configuration in which the distance between the coil and the second portion increases with increasing a distance from the first portion, the stray capacitance between the pad conductor and the coil can be adjusted with a length of the second portion.

In the one aspect described above, a width of the second portion in a direction defining a shortest distance between the coil and the second portion at a position away from the first portion may be smaller than a width of the second portion in the direction defining the shortest distance at a position close to the first portion.

In a configuration in which the width of the second portion in the direction defining the shortest distance at a position away from the first portion is smaller than the width of the second portion in the direction defining the shortest distance at a position close to the first portion, the stray capacitance between the pad conductor and the coil can be adjusted with the width of the second portion.

In the one aspect described above, each of the plurality of pad conductors may include a third portion that is separated from the second portion. The third portion may be continuous with the first portion and separated from the coil more than the first portion.

In a configuration in which each of the plurality of pad conductors includes the above-described third portion, an interval between each of the plurality of pad conductors and the coil is more easily adjusted with a form of each third portion. The stray capacitance between the plurality of pad conductors and the coil is further adjusted. Therefore, in this configuration, the self-resonant frequency can be further controlled.

In the one aspect described above, the third portion may be formed to extend from the first portion in a direction in which a distance between the third portion and the coil does not decrease.

In a configuration in which the third portion is formed as described above, the stray capacitance between the pad conductor and the coil can be adjusted with the direction in which the third portion extends.

In the one aspect described above, a distance between the coil and the third portion at a position away from the first portion may be larger than a distance between the coil and the third portion at a position close to the first portion.

In the one aspect described above, the distance between the coil and the third portion may increase with increasing a distance from the first portion.

In a configuration in which the distance between the coil and the third portion increases with increasing a distance from the first portion, the stray capacitance between the pad conductor and the coil may be adjusted with a length of the third portion.

In the one aspect described above, a width of the third portion in a direction defining a shortest distance between the coil and the third portion at a position away from the first portion may be smaller than a width of the third portion in the direction defining the shortest distance at a position close to the first portion.

In a configuration in which the width of the third portion in the direction defining the shortest distance at a position away from the first portion is smaller than the width of the third portion in the direction defining the shortest distance at a position close to the first portion, the stray capacitance between the pad conductor and the coil may be adjusted with the width of the third portion.

The present disclosure will become more fully understood from the detailed description given hereinafter and the accompanying drawings which are given by way of illustration only, and thus are not to be considered as limiting the present disclosure.

Further scope of applicability of the present disclosure will become apparent from the detailed description given hereinafter. However, it should be understood that the detailed description and specific examples, while indicating embodiments of the disclosure, are given by way of illustration only, since various changes and modifications within the spirit and scope of the disclosure will become apparent to those skilled in the art from this detailed description.

DETAILED DESCRIPTION OF EMBODIMENTS

Figure 1:
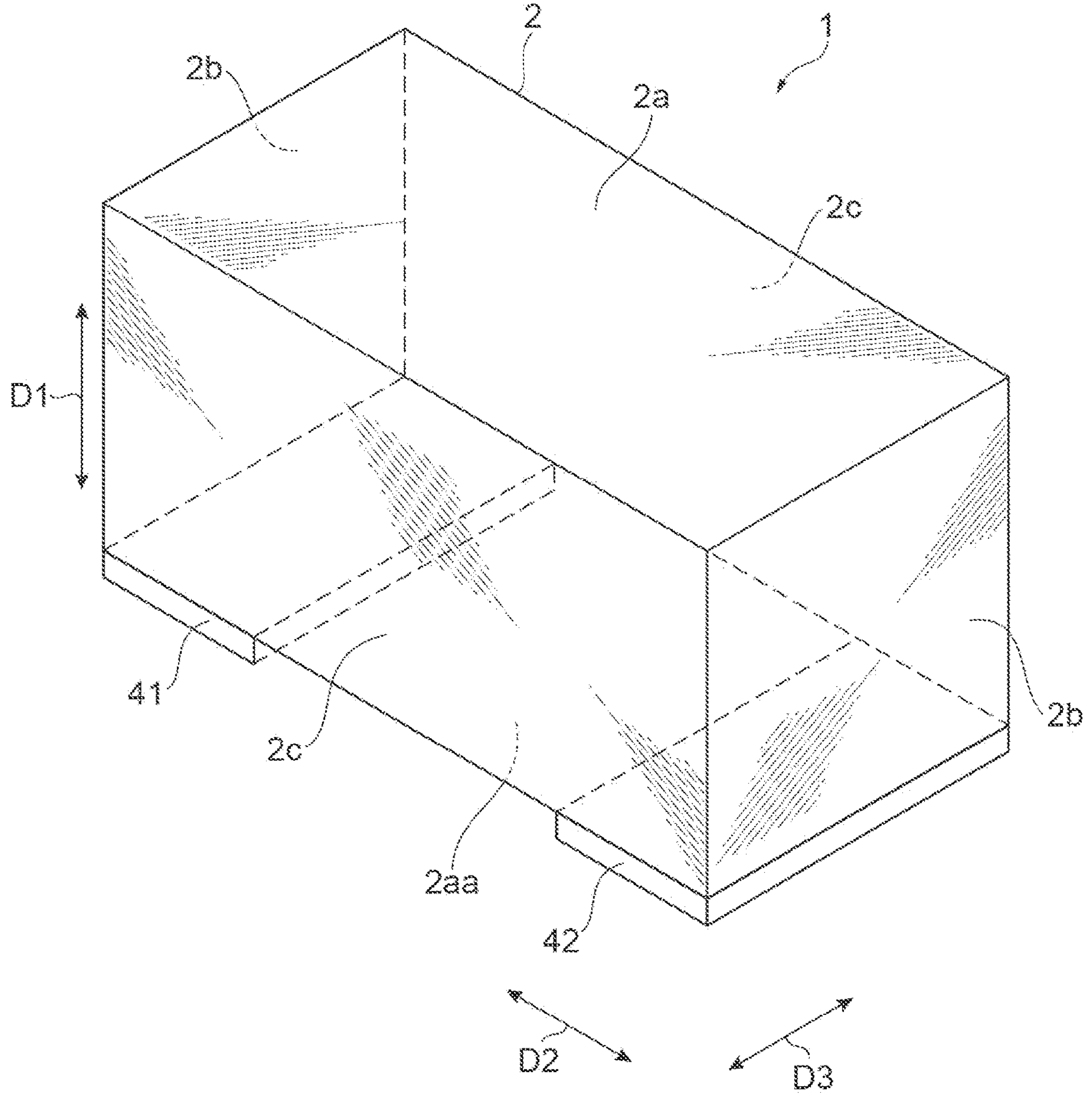
FIG. 1 is a perspective view illustrating a multilayer coil component according to an embodiment.

Hereinafter, embodiments of the present disclosure will be described in detail with reference to the accompanying drawings. In the following description, the same elements or elements having the same functions are denoted with the same reference numerals and overlapped explanation is omitted.

Figure 2:
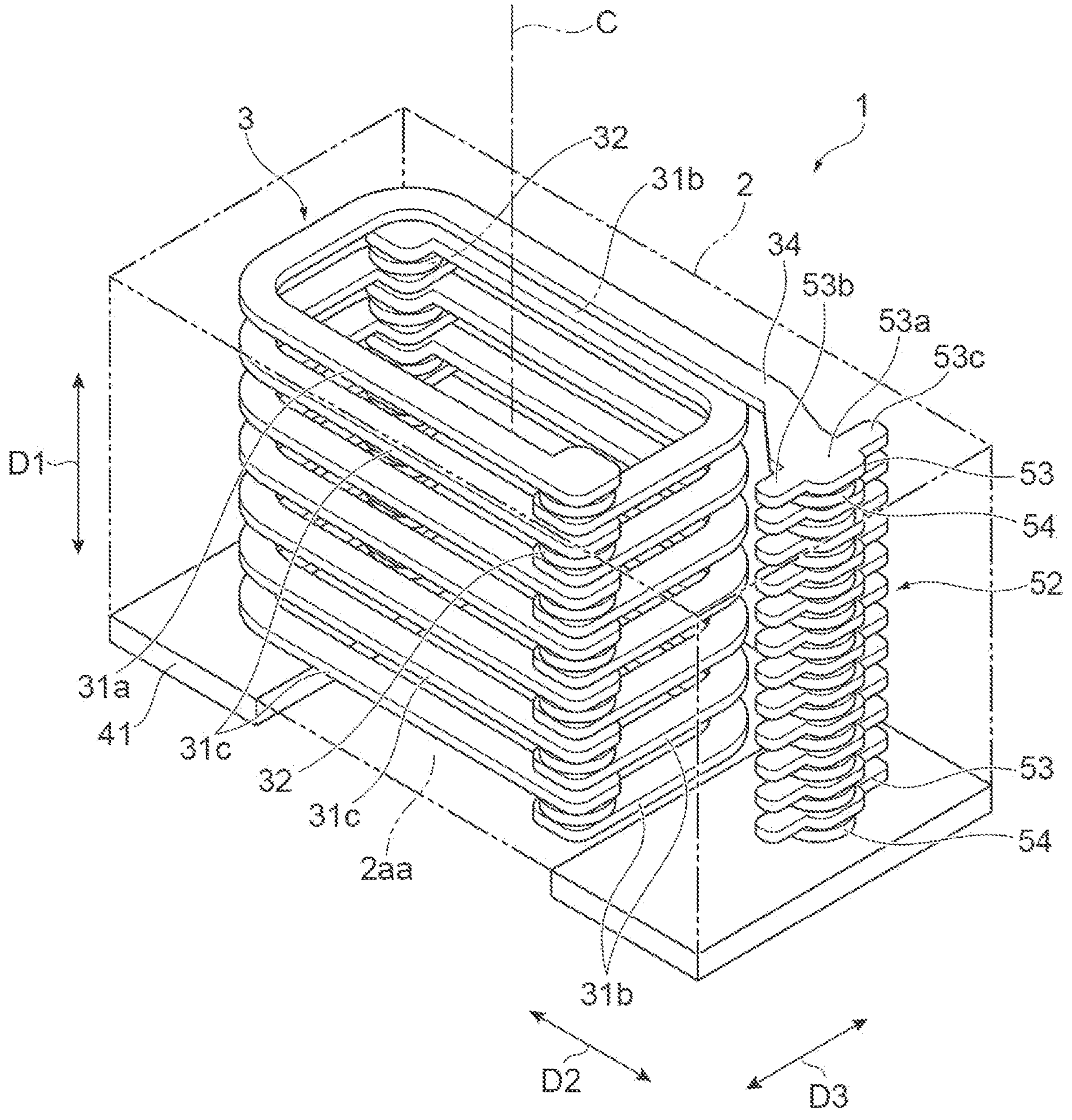
FIG. 2 is a perspective view illustrating a configuration of the multilayer coil component according to the present embodiment.
Figure 3:
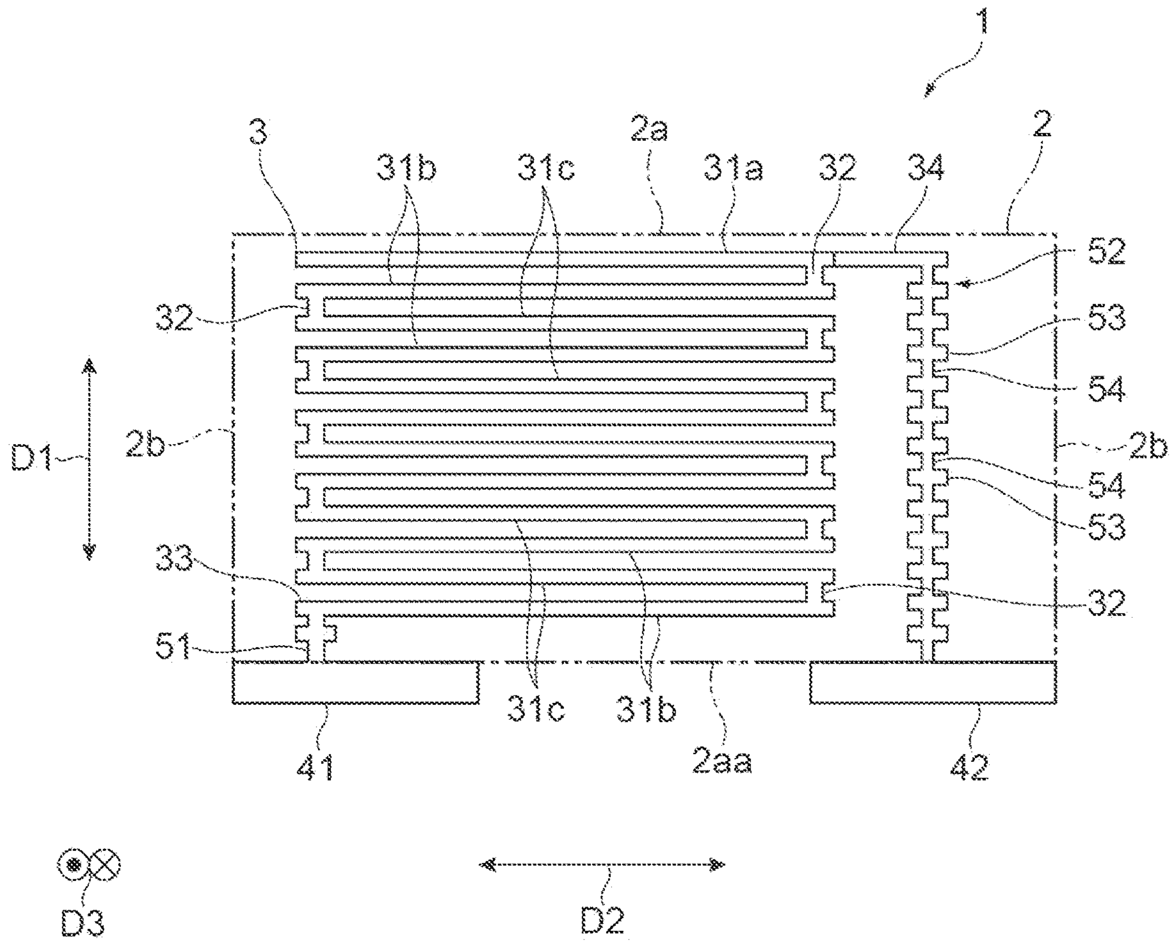
FIG. 3 is a diagram illustrating a configuration of the multilayer coil component according to the present embodiment.
Figure 4:
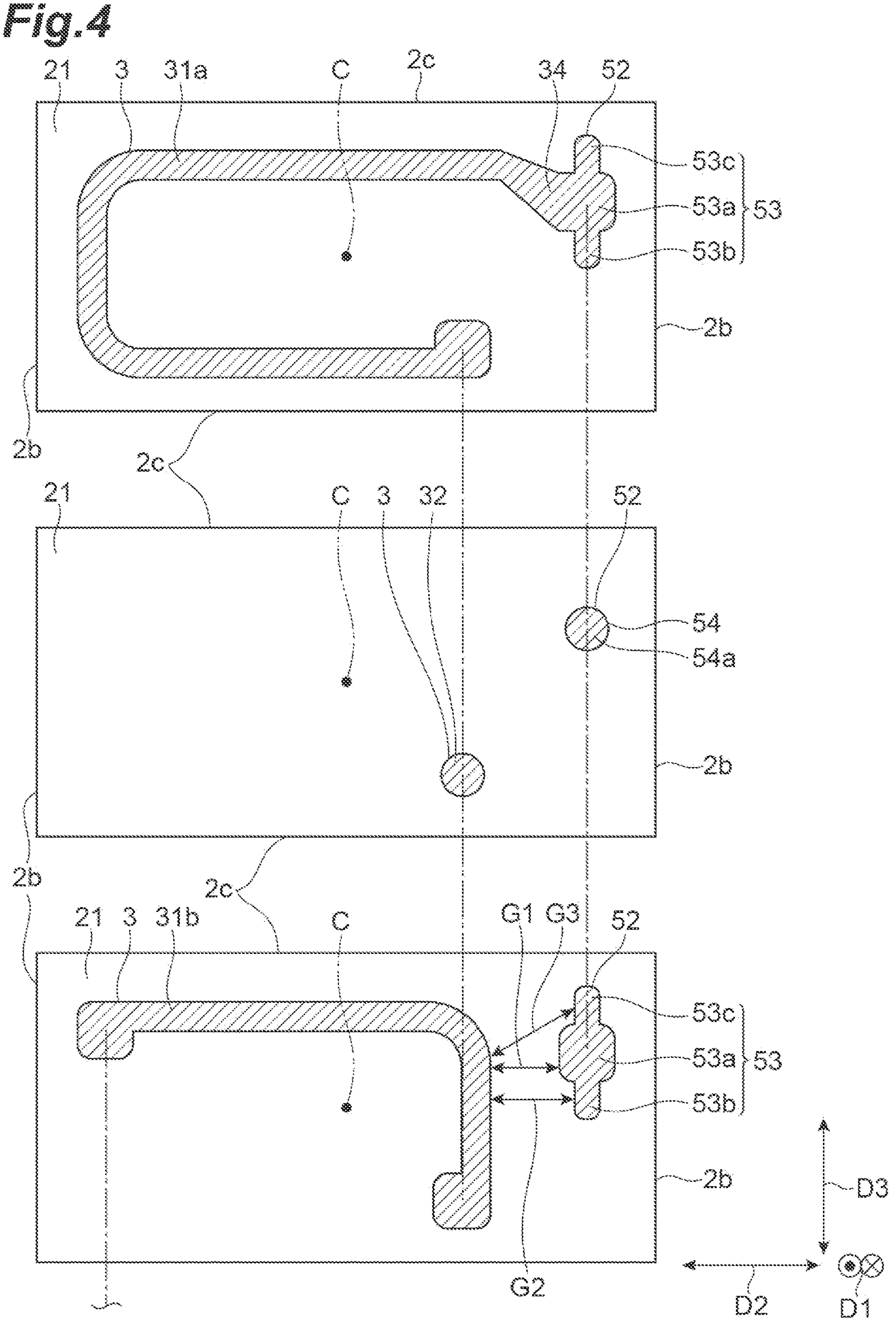
FIG. 4 is an exploded view illustrating a configuration of a part of the multilayer coil component according to the present embodiment.

A configuration of the multilayer coil component 1 according to the present embodiment will be described with reference to FIG. 1 to FIG. 4. FIG. 1 is a perspective view illustrating a multilayer coil component according to the present embodiment. FIG. 2 is a perspective view illustrating a configuration of the multilayer coil component according to the present embodiment. FIG. 3 is a diagram illustrating a configuration of the multilayer coil component according to the present embodiment. FIG. 4 is an exploded view illustrating a configuration of a part of the multilayer coil component according to the present embodiment. The multilayer coil component 1 is solder-mounted on an electronic device. The electronic device includes, for example, a circuit board or an electronic component.

As illustrated in FIG. 1 to FIG. 4, the multilayer coil component 1 includes an element body 2 having a rectangular parallelepiped shape, a coil 3 in the element body 2, external electrodes 41 and 42, and connection conductors 51 and 52 in the element body 2. The rectangular parallelepiped shape includes, for example, a rectangular parallelepiped shape in which corner portions and ridge portions are chamfered or a rectangular parallelepiped shape in which corner portions and ridge portions are rounded.

The element body 2 includes a pair of main surfaces 2*a* and 2*aa* opposing each other, a pair of side surfaces 2*b* opposing each other, and a pair of side surfaces 2*c* opposing each other. Each of the pair of main surfaces 2*a* and 2*aa*, the pair of side surfaces 2*b*, and the pair of side surfaces 2*c* has a rectangular shape. Each of the main surfaces 2*a* and 2*aa* is adjacent to each of the side surfaces 2*b*. Each of the main surfaces 2*a* and 2*aa* is adjacent to each of the side surfaces 2*c*.

The main surface 2*a* and the main surface 2*aa* oppose each other in a direction D1. The direction D1 is a direction that intersects each of the main surfaces 2*a* and 2*aa*. In the present embodiment, the direction D1 is a direction orthogonal to each of the main surfaces 2*a* and 2*aa*. The pair of side surfaces 2*b* oppose each other in a direction D2. The direction D1 is orthogonal to the direction D2. The direction D2 is a direction orthogonal to each side surface 2*b*. The pair of side surfaces 2*c* oppose each other in a direction D3. The direction D3 is a direction orthogonal to each side surface 2*c* and a direction parallel to each side surface 2*b*. The direction D3 is a direction parallel to each of the main surfaces 2*a* and 2*aa*. The direction D3 is orthogonal to the direction D1 and the direction D2.

As illustrated in FIG. 1, the external electrode 41 and the external electrode 42 are disposed on the main surface 2*aa*. The external electrode 41 and the external electrode 42 are separated from each other. For example, the external electrode 41 and the external electrode 42 are separated from each other in the direction D2. Each of the external electrode 41 and the external electrode 42 has, for example, a rectangular shape when viewed from the direction D1. In the multilayer coil component 1, the main surface 2*aa* opposes the electronic device. The main surface 2*aa* is arranged to constitute a mounting surface. The main surface 2*aa* includes the mounting surface. A plating layer may be disposed on a surface of each of the external electrodes 41 and 42. The plating layer is formed through, for example, electroplating or electroless plating. The plating layer includes, for example, Ni, Sn, or Au. For example, when the external electrode 41 includes a first external electrode, the external electrode 42 includes a second external electrode.

As illustrated in FIG. 4, the element body 2 is formed through laminating a plurality of insulator layers 21. The element body 2 includes a plurality of laminated insulator layers 21. In the element body 2, a direction in which the plurality of insulator layers 21 are laminated coincides with the direction D1. In the actual element body 2, the insulator layers 21 are integrated to such an extent that the boundaries between the insulator layers 21 cannot be visually recognized. Each insulator layer 21 is made of, for example, a magnetic material. The magnetic material includes, for example, a Ni—Cu—Zn-based ferrite material, a Ni—Cu—Zn—Mg-based ferrite material, or a Ni—Cu-based ferrite material. The magnetic material constituting each insulator layer 21 may include an Fe alloy. Each insulator layer 21 may be made of a nonmagnetic material. The non-magnetic material includes, for example, a glass-ceramic material or a dielectric material. In the present embodiment, each insulator layer 21 includes a sintered body of a green sheet containing the non-magnetic material.

As illustrated in FIG. 2, the coil 3 includes an imaginary coil axis C. The coil 3 is disposed in the element body 2 to have the coil axis C along a direction intersecting the main surface 2*aa*. In the present embodiment, the coil axis C is along the direction D1. The coil axis C extends in the direction D1, for example. As illustrated in FIG. 3 and FIG. 4, for example, the coil 3 is formed through stacking a plurality of coil conductor layers 31*a*, 31*b*, and 31*c* and a plurality of coil connection layers 32. The coil 3 includes the plurality of stacked coil conductor layers 31*a*, 31*b*, and 31*c* and the plurality of coil connection layers 32. That is, the coil 3 includes a plurality of turns. The plurality of turns is constituted by the plurality of coil conductor layers 31*a*, 31*b*, and 31*c*. The plurality of coil conductor layers 31*a*, 31*b*, and 31*c* and the plurality of coil connection layers 32 are stacked in the direction D1. In the actual coil 3, the plurality of coil conductor layers 31*a*, 31*b*, and 31*c* and the plurality of coil connection layers 32 are integrated to such an extent that the boundaries between the layers cannot be visually recognized. Each of the coil conductor layers 31*a*, 31*b*, and 31*c* is formed between corresponding insulator layers 21 of the plurality of insulator layers 21, for example. Each coil connection layer 32 is formed in, for example, a corresponding insulator layer 21 of the plurality of insulator layers 21. Each of the coil conductor layers 31*a*, 31*b*, and 31*c* and each of the coil connection layers 32 includes, for example, a sintered body of an electrically conductive paste. The coil 3 has, for example, a substantially rectangular outer contour when viewed from the direction D1.

The coil 3 includes one coil conductor layer 31*a*. Among the plurality of coil conductor layers 31*a*, 31*b*, and 31*c* is the coil conductor layer 31*a* most separated from the main surface 2*aa*. The coil conductor layer 31*a* is adjacent to the main surface 2*a*. The coil 3 includes the plurality of coil conductor layers 31*b*. In the present embodiment, the number of the plurality of coil conductor layers 31*b* is "5". The coil 3 includes the plurality of coil conductor layers 31*c*. In the present embodiment, the number of the plurality of coil conductor layers 31*c* is "6". The plurality of coil conductor layers 31*b* and 31*c* and the plurality of coil connection layers 32 are alternately disposed in the direction D1. Among the plurality of coil conductor layers 31*b*, the coil conductor layer 31*b* most separated from the main surface 2*aa* is connected to the coil conductor layer 31*a* through the coil connection layer 32. The coil conductor layer 31*a* and a coil conductor layer 31*b* adjacent to the coil conductor layer 31*a* are connected to each other through the coil connection layer 32. The plurality of coil conductor layers 31*b* and the plurality of coil conductor layers 31*c* are alternately disposed. The coil conductor layer 31*b* and the coil conductor layer 31*c* are adjacent to each other in the direction D1. The coil conductor layer 31*c* and the coil conductor layer 31*b* that are adjacent to each other in the direction D1 are connected to each other through the coil connection layer 32. The coil connection layer 32 is located between the coil conductor layer 31*c* and the coil conductor layer 31*b* that are adjacent to each other in the direction D1.

The coil 3 includes a pair of ends 33 and 34. The end 33 is closer to the main surface 2*aa* than the end 34. The end 34 is closer to the main surface 2*a* than the end 33. The end 34 is separated from the main surface 2*aa* more than the end 33. For example, when the end 33 includes a first end, the end 34 includes a second end. Among the plurality of coil conductor layers 31*b* is one coil conductor layer 31*b* including the end 33. The one coil conductor layer 31*b* including the end 33 is closest to the main surface 2*aa*. Among the plurality of coil conductor layers 31*c*, one coil conductor layer 31*c* may include the end 33 instead of the one coil conductor layer 31*b* described above. In this case, the one coil conductor layer 31*c* including end33 is closest to the main surface 2*aa*. The coil conductor layer 31*a* includes the end 34. In the direction D1, the end 33 and the external electrode 41 overlap each other. When viewed from the direction D1, the entire end 33 overlaps the external electrode 41. The end 33 and the external electrode 41 are connected through the connection conductor 51. The coil 3 is electrically connected to the external electrode 41. In the present embodiment, the connection conductor 51 includes at least one pad conductor and at least one through-hole conductor. The pad conductor and the through-hole conductor included in the connection conductor 51 are alternately disposed in the direction D1. In the direction D1, the end 34 and the external electrode 42 overlap each other. When viewed from the direction D1, the entire end 34 overlaps the external electrode 42. In the present embodiment, the end 34 is disposed to extend in the direction D2. The end 34 and the external electrode 42 are connected through the connection conductor 52. The coil 3 is electrically connected to the external electrode 42. For example, when the connection conductor 51 includes a first connection conductor, the connection conductor 52 includes a second connection conductor. When viewed from the direction D1, the connection conductor 51 may be disposed close to any one of the pair of side surfaces 2*c*. When viewed from the direction D1, the connection conductor 52 may be disposed close to any one of the pair of side surfaces 2*c*. The pad conductor included in the connection conductor 51 is formed between the corresponding insulator layers 21 among the plurality of insulator layers 21, for example. The through-hole conductor included in the connection conductor 51 is formed in a corresponding insulator layer 21 among the plurality of insulator layers 21, for example. The connection conductor 51 and the connection conductor 52 includes, for example, a sintered body of an electrically conductive paste.

The connection conductor 52 includes a plurality of pad conductors 53 and a plurality of through-hole conductors 54. The pad conductors 53 and the through-hole conductors 54 are alternately disposed in the direction D1 and separated from the coil 3. The pad conductors 53 and the through-hole conductors 54 are adjacent to each other in the direction D1. That is, the connection conductor 52 opposes the coil 3. The connection conductor 52 opposes the plurality of turns. Among the plurality of pad conductors 53, the pad conductor 53 closest to the main surface 2*a* is connected to the end 34. Among the plurality of pad conductors 53, the pad conductor 53 connected to the end 34 is most separated from the main surface 2*aa*. The end 34 may be formed integrally with the pad conductor 53 closest to the main surface 2*a*. In other words, the coil conductor layer 31*a* may be formed integrally with the pad conductor 53 closest to the main surface 2*a*. Among the plurality of through-hole conductors 54, the through-hole conductor 54 closest to the main surface 2*aa* is connected to the external electrode 42. Each pad conductor 53 is formed between corresponding insulator layers 21 among the plurality of insulator layers 21, for example. Each through-hole conductor 54 is formed in, for example, a corresponding insulator layer 21 among the plurality of insulator layers 21.

Each of the plurality of through-hole conductors 54 includes a connection end 54*a* connected to an adjacent pad conductor 53 among the plurality of pad conductors 53. When viewed from the direction D1, the entirety of each connection end 54*a* overlaps the adjacent pad conductor 53 described above. When viewed from the direction D1, an area of each pad conductor 53 is larger than an area of a corresponding connection end 54*a* of the connection ends 54*a*.

Figure 5A:
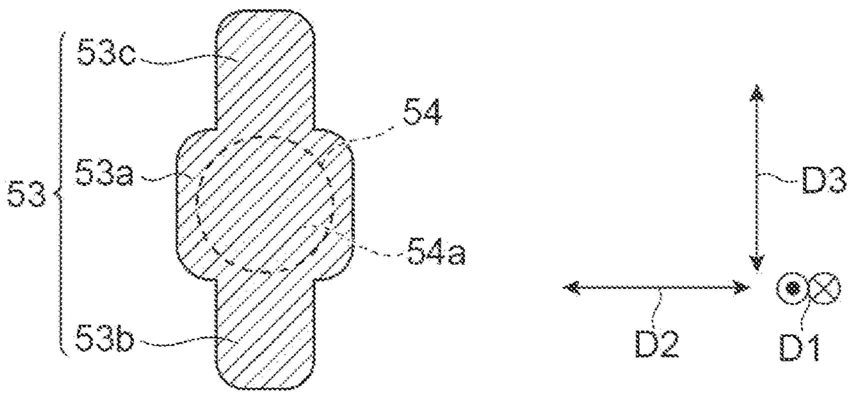
FIG. 5A to FIG. 5D are plan views illustrating examples of pad conductor.

FIG. 5A is a plan view of the pad conductor 53 according to the present embodiment. As illustrated in FIG. 4 and FIG. 5A, each of the plurality of pad conductors 53 includes a portion 53*a* and a portion 53*b*. Each of the plurality of pad conductors 53 includes a portion 53*c*. The portion 53*a* overlaps the entire connection end 54*a* of the adjacent through-hole conductor 54 among the plurality of through-hole conductors 54. The portion 53*b* and the portion 53*c* are continuous with the portion 53*a* and separated from the coil3 more than the portion 53*a*. When viewed from the direction D1, an area of the portion 53*a* is larger than an area of the connection end 54*a*. For example, the portion D1 viewed from the direction 53*a* has a rectangular shape. For example, the connection end 54*a* viewed from the direction D1 has a circular shape. For example, when the portion 53*a* includes a first portion, the portion 53*b* may include a second portion and the portion 53*c* may include a third portion. For example, when the portion 53*a* includes a first portion, the portion 53*c* may include a second portion and the portion 53*b* may include a third portion. Each of the plurality of pad conductors 53 may include only one of portion 53*a* and portion 53*b*.

In FIG. 4, the coil conductor layers 31*a* and 31*b*, the coil connection layer 32, the pad conductors 53, and the through-hole conductors 54 are hatched in order to emphasize the configurations of the coil conductor layers 31*a* and 31*b*, the coil connection layer 32, the pad conductors 53, and the through-hole conductors 54. In FIG. 5A, the pad conductor 53 is hatched in order to emphasize the configuration of the pad conductor 53.

As described above, the portion 53*b* and the portion 53*c* are separated from the coil 3 more than the portion 53*a*. That is, an interval between the portion 53*b* and the coil 3 is larger than an interval between the portion 53*a* and the coil 3, and an interval between the portion 53*c* and the coil 3 is also larger than the interval between the portion 53*a* and the coil 3. The distance between the portion 53*a* and the coil 3 is defined by, for example, a shortest distance G1 between the portion 53*a* and the coil 3. In this case, in the present embodiment, the shortest distance G1 is defined by a shortest distance between the portion 53*a* and the coil conductor layer 31*b* that are in the same layer. The portion 53*a* has the shortest distance G1 from the coil 3.

The distance between the portion 53*b* and the coil 3 is defined by, for example, a shortest distance G2 between the portion 53*b* and the coil 3. In this case, in the present embodiment, the shortest distance G2 is defined by a shortest distance between the portion 53*b* and the coil conductor layer 31*b* that are in the same layer. The portion 53*b* has the shortest distance G2 from the coil 3.

The distance between the portion 53*c* and the coil 3 is defined by, for example, a shortest distance G3 between the portion 53*c* and the coil 3. In this case, in the present embodiment, the shortest distance G3 is defined by a shortest distance between the portion 53*c* and the coil conductor layer 31*b* that are in the same layer. The portion 53*c* has the shortest distance G3 from the coil 3.

The shortest distance G2 is larger than the shortest distance G1, and the shortest distance G3 is also larger than the shortest distance G1. The shortest distance G2 and the shortest distance G3 may be equal to or different from each other.

A direction defining the shortest distance G2 is, for example, along the direction D2. A direction defining the shortest distance G2 intersects the direction D2 and the direction D3, for example. For example, when the shortest distance G1 includes a first shortest distance, the shortest distance G2 includes a second shortest distance. For example, when the shortest distance G1 includes the first shortest distance, the shortest distance G3 includes a third shortest distance.

The portion 53*b* and the portion 53*c* are formed to extend from the portion 53*a* in a direction that intersects the direction D1. The portion 53*b* is formed to extend in a direction in which the portion 53*b* does not approach the coil 3. The portion 53*b* is formed to extend to the direction D3, for example. The direction in which the portion 53*b* does not approach the coil 3 is a direction in which a length between the portion 53*b* and the coil 3 does not decrease. In the portion 53*b*, the shortest distance G2 at least does not decrease with increasing a distance from the portion 53*a*. The portion 53*c* is formed to extend in a direction in which the portion 53*c* does not approach the coil 3. The portion 53*c* is formed to extend to the direction D3, for example. The direction in which the portion 53*c* does not approach the coil 3 is a direction in which a length between the portion 53*c* and the coil 3 does not decrease. In the portion 53*c*, the shortest distance G3 does at least not decrease with increasing a distance from the portion 53*a*. The portion 53*b* extends in one direction of the direction D3, and the portion 53*c* extends in another direction of the direction D3. The portion 53*b* and the portion 53*c* extend in opposite directions. As illustrated in FIG. 4 and FIG. 5A, in the present embodiment, each of portion 53*b* and portion 53*c* has a substantially rectangular shape.

As described above, in the multilayer coil component 1, each of the plurality of pad conductors 53 includes the portion 53*a* and the portion 53*b* continuous with the portion 53*a*. The portion 53*a* overlaps the entire connection end 54*a* of the adjacent through-hole conductor 54 among the plurality of through-hole conductors 54. The portion 53*b* is separated from coil 3 more than portion 53*a*.

In the multilayer coil component 1, an interval between each of the plurality of pad conductors 53 and the coil 3 may be easily adjusted with a form of each portion 53*b*. Stray capacitance between the plurality of pad conductors 53 and the coil 3 is adjusted. Therefore, in the multilayer coil component 1, self-resonant frequency can be controlled.

In the multilayer coil component 1, the stray capacitance can be reduced, for example. In the multilayer coil component 1, a decrease in the self-resonant frequency can be restrained.

Each of the plurality of pad conductors 53 includes a portion 53*b* that is separated from a portion 53*c*. The portion 53*c* is continuous with the portion 53*a* and separated from the coil 3 more than the portion 53*a*.

In the multilayer coil component 1, an interval between each of the plurality of pad conductors 53 and the coil 3 may be more easily adjusted with a form of each portion 53*c*. The stray capacitance between the plurality of pad conductors 53 and the coil 3 is further adjusted. Therefore, in the multilayer coil component 1, the self-resonant frequency can be further controlled.

In the multilayer coil component 1, the stray capacitance can be further reduced, for example. In the multilayer coil component 1, the decrease in the self-resonant frequency can be further restrained.

Each portion 53*b* is formed to extend from the portion 53*a* in the direction in which the length between the portion 53*b* and the coil 3 does not decrease. Each portion 53*c* is formed to extend from the portion 53*a* in the direction in which the length between the portion 53*c* and the coil 3 does not decrease.

In the multilayer coil component 1, the stray capacitance between each pad conductor 53 and the coil 3 can be adjusted with the direction in which each portion 53*b* extends. In the multilayer coil component 1, the stray capacitance generated between each pad conductor 53 and the coil 3 can be adjusted with the direction in which each portion 53*c* extends.

The direction in which the length between the portion 53*b* and the coil 3 does not decrease may be a direction other than the direction defining the shortest length between the portion 53*b* and the coil 3. The direction in which the length between the portion 53*c* and the coil 3 does not decrease may be a direction other than the direction defining the shortest length between the portion 53*c* and the coil 3.

The pad conductor included in the connection conductor is formed, for example, through firing a conductor pattern formed on a green sheet. This pad conductor includes the pad conductor 53. The conductive pattern is formed through applying an electrically conductive paste. The conductor pattern is a region where the electrically conductive paste is patterned. The through-hole conductor included in the connection conductor is formed, for example, through firing an electrically conductive paste filled in a through-hole formed in a green sheet. This through-hole conductor includes, for example, the through-hole conductor 54. The through hole is filled with the electrically conductive paste, for example, when a conductor pattern is formed.

The connection conductor includes, for example, a plurality of pad conductors and a plurality of through-hole conductors that are alternately disposed. This connection conductor includes, for example, the connection conductor 52. The connection conductor 52 includes the plurality of pad conductors 53 and the plurality of through-hole conductors 54, for example. Each of the plurality of through-hole conductors includes a connection end connected to an adjacent pad conductor among the plurality of pad conductors. Each through-hole conductor 54 includes the connection end 54*a*, for example. The area of each pad conductor is larger than the area of each connection end. Therefore, when making the multilayer coil component, even when a positional deviation occurs between one conductor pattern and another conductor pattern located on the one conductor pattern in a direction intersecting the lamination direction, the pad conductor and the connection end corresponding to each other reliably overlap each other. For example, pad conductor and the entire connection end reliably overlap. Consequently, the connection conductor reliably maintains connectivity between the through-hole conductor and the pad conductor adjacent to each other.

Each of the plurality of pad conductors 53 includes the portion 53*a*, as described above. When viewed from the direction D1, the area of the portion 53*a* is larger than the area of the connection end 54*a*. Therefore, even when the above-described positional deviation occurs in the making process of the multilayer coil component 1, the portion 53*a* reliably overlaps the connection end 54*a*. For example, the portion 53*a* reliably overlaps the entire connection end 54*a*. Consequently, the connection conductor 52 reliably maintains connectivity between the through-hole conductor 54 and the pad conductor 53 adjacent to each other. As described above, in the multilayer coil component 1, the stray capacitance between the plurality of pad conductors 53 and the coil 3 can be reduced.

In the multilayer coil component 1, the connectivity between the through-hole conductor 54 and the pad conductor 53 is reliably maintained and the decrease in the self-resonant frequency can be restrained.

For example, the conductor pattern is formed through screen printing. In screen printing, an electrically conductive paste is applied to a green sheet through a screen-printing forme. A mask is formed on a mesh of the screen-printing forme. The mask is formed with openings at positions corresponding to the conductor patterns. The electrically conductive paste placed on the screen-printing forme passes through the openings and is applied to the green sheet.

The mesh of the screen-printing forme is formed with recesses at positions where a plurality of wire materials constituting the mesh intersect. Hereinafter, the above-described recesses are referred to as “mesh recesses”. When the electrically conductive paste is applied to the green sheet, the electrically conductive paste applied to the green sheet may enter the mesh recesses. When the electrically conductive paste enters the mesh recesses, the electrically conductive paste may be carried away from the green sheet. When the electrically conductive paste is carried away from the green sheet, the amount of the electrically conductive paste applied to the green sheet may decrease. When the amount of the electrically conductive paste applied to the green sheet decreases, the conductor pattern having a desired shape tends not to be obtained.

Each of the plurality of pad conductors 53 includes the portion 53*b* as described above. The pad conductor 53 including the portions 53*a* and 53*b* is larger than the pad conductor including only the portion 53*a*. When forming each pad conductor 53, the amount of electrically conductive paste required for the conductor pattern for forming the pad conductor 53 including the portions 53*a* and 53*b* is larger than the amount of electrically conductive paste required for the conductor pattern for forming the pad conductor including only the portion 53*a*. Therefore, when forming the conductor pattern for forming the pad conductor 53 including the portions 53*a* and 53*b*, even if the electrically conductive paste is carried away from the green sheet, the conductor pattern having the desired shape tends to be obtained. Since the conductor pattern having the desired shape tends to be obtained when forming the connection conductor 52, each pad conductor 53 reliably overlaps with the entire corresponding connection end 54*a*. Consequently, in the multilayer coil component 1, the connectivity between the through-hole conductor 54 and the pad conductor 53 is reliably maintained. Similarly, in the multilayer coil component 1, a connectivity between the through-hole conductor and the pad conductor in the connection conductor 51.

Each of the plurality of pad conductors 53 includes the portion 53*c* as described above. The pad conductor 53 including the portions 53*a*, 53*b*, and 53*c* is larger than the pad conductor including only the portion 53*a*. When forming each pad conductor 53, the amount of electrically conductive paste required for the conductor pattern for forming the pad conductor 53 including the portions 53*a*, 53*b*, and 53*c* is larger than the amount of electrically conductive paste required for the conductor pattern for forming the pad conductor including only the portion 53*a*. Therefore, when forming the conductor pattern for forming the pad conductor 53 including the portions 53*a*, 53*b*, and 53*c*, even if the electrically conductive paste is carried away the green sheet, the conductor pattern having the desired shape tends to be obtained. Since a conductor pattern having the desired shape tends to be obtained when forming the connection conductor 52, each pad conductor 53 more reliably overlaps with the entire corresponding connection end 54*a*. Consequently, in the multilayer coil component 1, the connectivity between the through-hole conductor 54 and the pad conductor 53 is further reliably maintained.

The size of the pad conductor 53 including both the portions 53*b* and the portion 53*c* tends to be larger than the size of the pad conductor 53 including only either the portion 53*b* or the portion 53*c*. Therefore, when forming the connection conductor 52, the amount of electrically conductive paste applied to the conductor pattern can be easily increased.

Figure 5B:
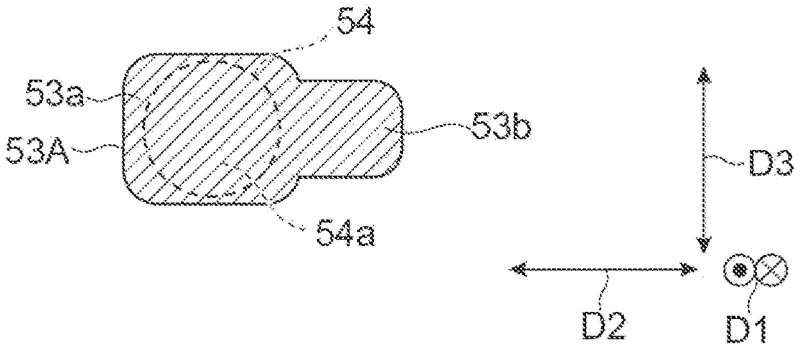
Figure 5C:
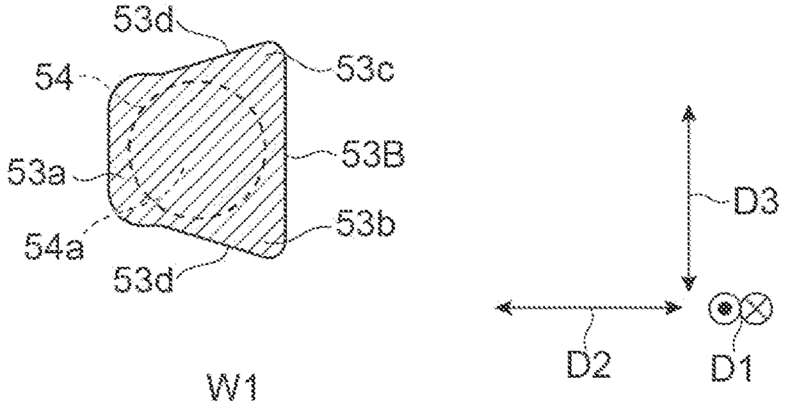
Figure 5D:
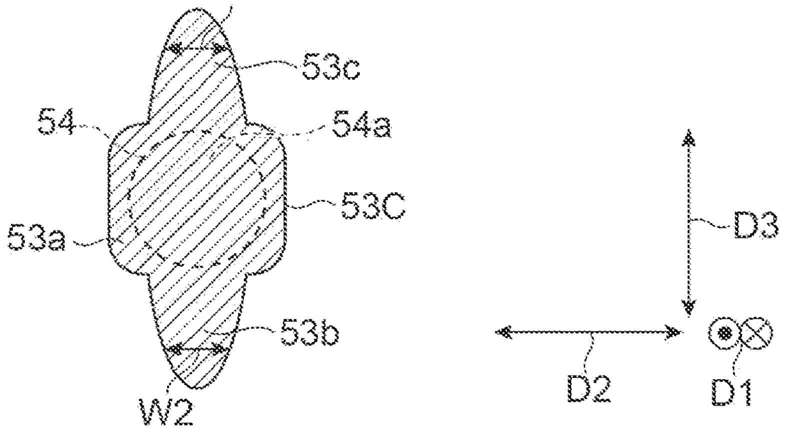

Next, each configuration of a plurality of modifications of the pad conductor 53 will be described with reference to FIG. 5B to FIG. 5D. In FIG. 5B to FIG. 5D, the coil 3 is not illustrated.

FIG. 5B is a diagram illustrating a pad conductor 53A according to one modification. Hereinafter, the configuration of the pad conductor 53A will be described focusing on the difference from the pad conductor 53. The multilayer coil component 1 described above includes, for example, a plurality of pad conductors 53A instead of the plurality of pad conductors 53. The pad conductor 53A does not include the portion 53*c*. The pad conductor 53A includes the portion 53*b*. The portion 53*b* included in the pad conductor 53A is formed to extend from the portion 53*a* in the direction separated from the coil 3 among the directions defining the shortest distance between the coil 3 and the portion 53*b*. The portion 53*b* included in the pad conductor 53A has a substantially rectangular shape. The portion 53*b* included in the pad conductor 53A extends, for example, in a direction separated from the coil 3 along the direction D2.

In FIG. 5B, the pad conductor 53A is hatched in order to emphasize the configuration of the pad conductor 53A.

FIG. 5C is a diagram illustrating a pad conductor 53B according to another modified example. Hereinafter, the configuration of the pad conductor 53B will be described focusing on the difference from the pad conductor 53. The multilayer coil component 1 described above includes, for example, a plurality of pad conductors 53B instead of the plurality of pad conductors 53. The pad conductor 53B includes the portion 53*b* and the portion 53*c*. In the portion 53*b* included in the pad conductor 53B, the distance between the coil 3 and the portion 53*b* at a position away from the portion 53*a* is larger than the distance between the coil 3 and the portion 53*b* at a position close to the portion 53*a*. For example, the distance between the coil 3 and the portion 53*b* increases with increasing a distance from the portion 53*a*. In the portion 53*b* included in the pad conductor 53B, the shortest distance G2 at a position away from the portion 53*a* is larger than the shortest distance G2 at a position close to the portion 53*a*. For example, the shortest distance G2 increases with increasing a distance from the portion 53*a*. In the portion 53*c* included in the pad conductor 53B, the distance between the coil 3 and the portion 53*c* at a position away from the portion 53*a* is larger than the distance between the coil 3 and the portion 53*c* at a position close to the portion 53*a*. For example, the distance between the coil 3 and the portion 53*c* increases with increasing a distance from the portion 53*a*. In the portion 53*c* included in the pad conductor 53B, the shortest distance G3 at a position away from the portion 53*a* is larger than the shortest distance G3 at a position close to the portion 53*a*. For example, the shortest distance G3 increases with increasing a distance from the portion 53*a*. For example, when viewed from the direction D1, the pad conductor 53B has a substantially trapezoidal shape. The pad conductor 53B having a substantially trapezoidal shape includes a pair of parallel sides and a pair of legs 53*d* in plan view. The pair of parallel sides extends along the direction D3, for example. In the direction D3, one of the pair of parallel sides is longer than another of the pair of parallel sides. One of the pair of parallel sides is separated from the coil 3 more than the other of the pair of parallel sides. That is, the other of the pair of parallel sides is closer to the coil 3 than the one of the pair of parallel sides. Each of the pair of legs 53*d* extends such that a distance between each of the pair of legs 53*d* and the coil 3 increase with increasing a distance from the portion 53*a*.

In the multilayer coil component 1 including the pad conductor 53B, stray capacitance between the pad conductor 53B and the coil 3 can be adjusted with a length of the portion 53*b*.

In the multilayer coil component 1 including the pad conductor 53B, the stray capacitance between the pad conductor 53B and the coil 3 can be adjusted with a length of the portion 53*c*.

In FIG. 5C, the pad conductor 53B is hatched in order to emphasize the configuration of the pad conductor 53B.

FIG. 5D is a diagram illustrating a pad conductor 53C according to still another modification. Hereinafter, the configuration of the pad conductor 53C will be described focusing on the difference from the pad conductor 53. The multilayer coil component 1 described above includes, for example, a plurality of pad conductors 53C instead of the plurality of pad conductors 53. The pad conductor 53*c* includes the portion 53*b* and the portion 53*c*. A width of the portion 53*b* in a direction defining the shortest distance between the coil 3 and the portion 53*b* at a position away from the portion 53*a* is smaller than the width of the portion 53*b* in the direction defining the shortest distance between the coil 3 and the portion 53*b* at a position close to the portion 53*a*. For example, the portion 53*b* included in the pad conductor 53C has a first width at a position close to the portion 53*a* and has a second width smaller than the first width at a position away from the portion 53*a*. For example, the width W1 of the portion 53*b* included in the pad conductor 53C decreases with increasing a distance from the portion 53*a*. For example, the direction defining the shortest distance between the coil 3 and the portion 53*b* is the direction D2. A width of the portion 53*c* in a direction defining the shortest distance between the coil 3 and the portion 53*c* at a position away from the portion 53*a* is smaller than the width of the portion 53*c* in the direction defining the shortest distance between the coil 3 and the portion 53*c* at a position close to the portion 53*a*. For example, the portion 53*c* included in the pad conductor 53C has a third width at a position close to the portion 53*a* and has a fourth width smaller than the third width at a position away from the portion 53*a*. For example, the width W2 of the portion 53*c* included in the pad conductor 53C decreases with increasing a distance from the portion 53*a*. For example, the direction defining the shortest distance between the coil 3 and the portion 53*c* is the direction D2. The portion 53*b* has a substantially tapered shape in which the width W1 decreases toward a tip of the portion 53*b*. The portion 53*c* has a substantially tapered shape in which the width W2 decreases toward a tip of the portion 53*c*.

In the multilayer coil component 1 including the pad conductor 53C, stray capacitance between the pad conductor 53C and the coil 3 can be adjusted with the width of the portion 53*b*.

In the multilayer coil component 1 including the pad conductor 53C, the stray capacitance between the pad conductor 53C and the coil 3 can be adjusted with the width of the portion 53*c*.

In FIG. 5D, the pad conductor 53C is hatched in order to emphasize the configuration of the pad conductor 53C.

Next, the fact that the self-resonant frequency can be controlled in the present embodiment will be described based on an example and a comparative example. In the example, Q Characteristics of the multilayer coil component 1 according to the present embodiment were confirmed. In the example, each of the plurality of pad conductors 53 includes the portion 53*b* and the portion 53*c*. In the comparative example, Q Characteristics of a multilayer coil component in which each of the plurality of pad conductors 53 does not include the portion 53*b* and the portion 53*c* were confirmed. In the comparative example, each of the plurality of pad conductors 53 includes only the portion 53*a*.

Figure 6:
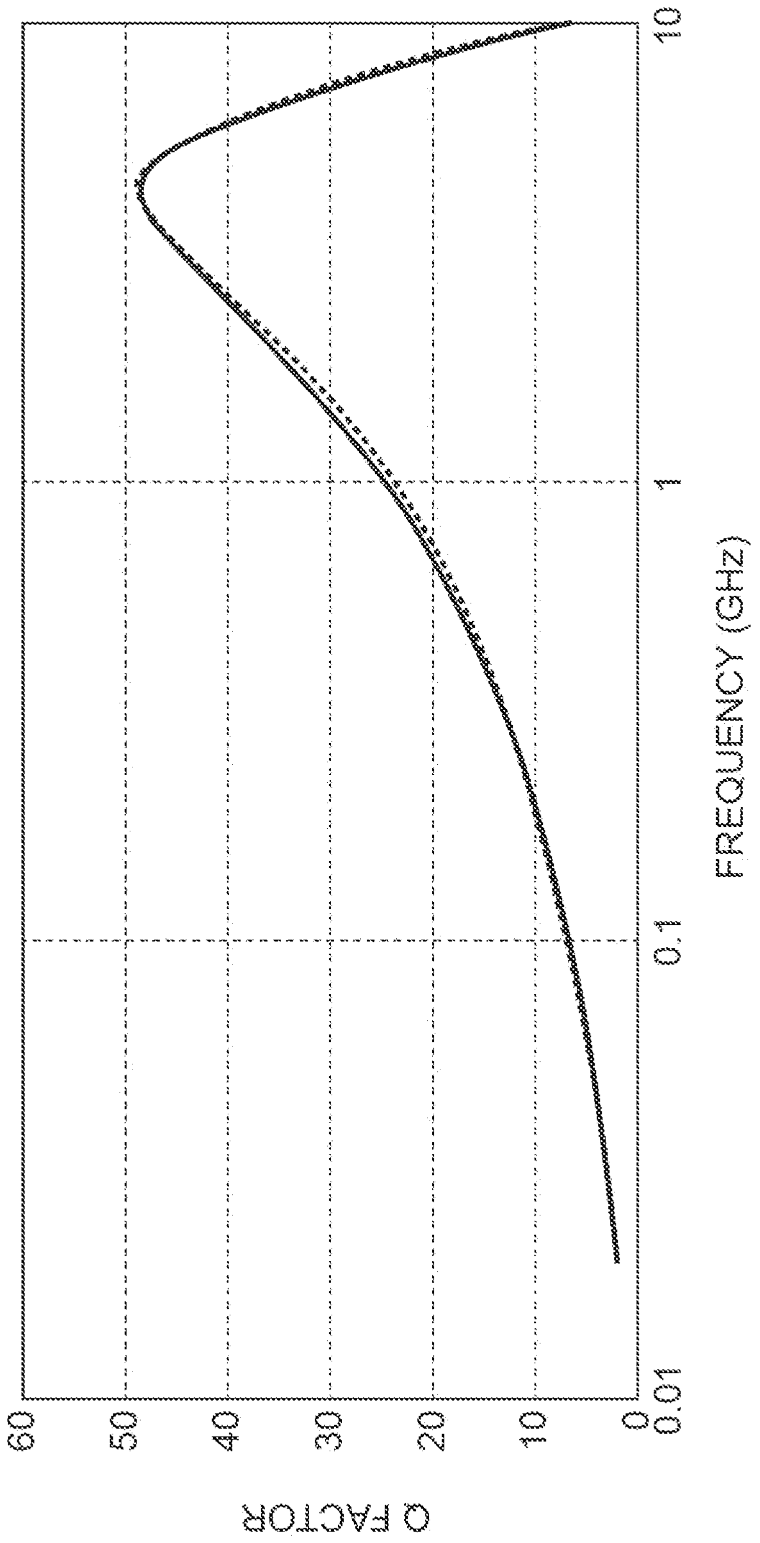
FIG. 6 is a diagram illustrating frequency response characteristics of the multilayer coil component.

Confirmation results in the example and comparative example are illustrated to FIG. 6. FIG. 6 is a diagram illustrated frequency response characteristics of a multilayer coil component. FIG. 6 illustrates the Q Characteristics of the multilayer coil component. Q Characteristics is, for example, frequency response characteristics of quality factor (Q factor). In FIG. 6, Q Characteristics in the above-described example is illustrated by a solid line, and Q Characteristics in the above-described comparative example is illustrated by a broken line.

As illustrated in FIG. 6, the example and the comparative example have steep Q Characteristics with a high quality factor in a high frequency band. The example and the comparative example have substantially the same Q Characteristics. That is, although each of the plurality of pad conductors 53 includes the portion 53*b* and the portion 53*c*, the example has substantially the same Q Characteristics as the comparative example. The reason why the example and the comparative example have substantially the same Q Characteristics is that the stray capacitance between the plurality of pad conductors 53 and the coil 3 is controlled in the example. In the example, the stray capacitance between the plurality of pad conductors 53 and the coil 3 is controlled by, for example, restraining an increase in the stray capacitance between the plurality of pad conductors 53 and the coil 3. Therefore, in the example, the self-resonant frequency can be controlled.

Consequently, it is confirmed that the self-resonant frequency can be controlled according to the present embodiment.

Although the embodiment and modifications of the present disclosure have been described above, the present disclosure is not necessarily limited to the embodiment and modifications, and the embodiment can be variously changed without departing from the scope of the disclosure.

The coil 3 may have a substantially polygonal outer contour when viewed from a direction in which the coil axis C extends. The coil 3 may have a substantially circular outer contour when viewed from the direction in which the coil axis C extends. The circular includes a perfect circle, an ellipse, or an oval.

When viewed from the direction in which the coil axis C extends, each of the connection conductor 51 and the connection conductor 52 may be disposed substantially equidistant from the pair of side surfaces 2*c*. When viewed from the direction in which the coil axis C extends, the connection conductor 51 may be disposed close to one of the pair of side surfaces 2*c*, and the connection conductor 52 may be disposed close to another of the pair of side surfaces 2*c*. When viewed from the direction in which the coil axis C extends, the connection conductor 51 and the connection conductor 52 may be disposed at diagonal positions with respect to the coil axis C.

What is claimed is:

1. A multilayer coil component comprising:

an element body including a main surface arranged to constitute a mounting surface;

a first external electrode and a second external electrode disposed on the main surface and separated from each other;

a coil disposed in the element body to have a coil axis along a direction intersecting the main surface, the coil including a first end and a second end separated from the main surface more than the first end;

a first connection conductor connecting the first external electrode and the first end; and a second connection conductor connecting the second external electrode and the second end, wherein the second connection conductor includes a plurality of pad conductors and a plurality of through-hole conductors that are alternately disposed in a direction crossing the main surface and separated from the coil, each of the plurality of through-hole conductors includes a connection end connected to an adjacent pad conductor among the plurality of pad conductors, each of the plurality of pad conductors includes:

a first portion overlapping an entire connection end included in an adjacent through-hole conductor among the plurality of through-hole conductors;

a second portion that is continuous with the first portion and is separated from the coil more than the first portion; and a constriction located at a transition between the first portion and the second portion.

2. The multilayer coil component according to claim 1, wherein for each of the plurality of pad conductors, the second portion is formed to extend from the first portion in a direction in which a distance between the second portion and the coil does not decrease.

3. The multilayer coil component according to claim 1, wherein for each of the plurality of pad conductors, a distance between the coil and the second portion at a position away from the first portion is larger than a distance between the coil and the second portion at a position close to the first portion.

4. The multilayer coil component according to claim 3, wherein for each of the plurality of pad conductors, the distance between the coil and the second portion increases with increasing a distance from the first portion.

5. The multilayer coil component according to claim 1, wherein for each of the plurality of pad conductors, a width of the second portion in a direction defining a shortest distance between the coil and the second portion at a position away from the first portion is smaller than a width of the second portion in the direction defining the shortest distance at a position close to the first portion.

6. The multilayer coil component according to claim 1, wherein for each of the plurality of pad conductors:

a third portion is included that is separated from the second portion, the third portion is continuous with the first portion and is separated from the coil more than the first portion, and a constriction is located at a transition between the first portion and the third portion.

7. The multilayer coil component according to claim 6, wherein for each of the plurality of pad conductors, the third portion is formed to extend from the first portion in a direction in which a distance between the third portion and the coil does not decrease.

8. The multilayer coil component according to claim 6, wherein for each of the plurality of pad conductors a distance between the coil and the third portion at a position away from the first portion is larger than a distance between the coil and the third portion at a position close to the first portion.

9. The multilayer coil component according to claim 8, wherein for each of the plurality of pad conductors, the distance between the coil and the third portion increases with increasing a distance from the first portion.

10. The multilayer coil component according to claim 6, wherein for each of the plurality of pad conductors, a width of the third portion in a direction defining a shortest distance between the coil and the third portion at a position away from the first portion is smaller than a width of the third portion in the direction defining the shortest distance at a position close to the first portion.

11. A multilayer coil component comprising:

an element body including a main surface;

a first external electrode and a second external electrode disposed on the main surface;

a coil disposed in the element body and including a plurality of turns;

a first connection conductor connecting the first external electrode and the coil; and a second connection conductor connecting the second external electrode and the coil and opposing the plurality of turns, wherein the second connection conductor includes a pad conductor and a through-hole conductor that are adjacent to each other, the through-hole conductor includes a connection end connected to the pad conductor, and the pad conductor includes:

a first portion overlapping the entire connection end and having a first shortest distance from the coil;

a second portion continuous with the first portion and having a second shortest distance from the coil that is larger than the first shortest distance; and a constriction located at a transition between the first portion and the second portion.

12. The multilayer coil component according to claim 11, wherein in the second portion, the second shortest distance at least does not decrease with increasing a distance from the first portion.

13. The multilayer coil component according to claim 11, wherein in the second portion, the second shortest distance at a position away from the first portion is larger than the second shortest distance at a position close to the first portion.

14. The multilayer coil component according to claim 13, wherein the second shortest distance increases with increasing a distance from the first portion.

15. The multilayer coil component according to claim 11, wherein the second portion has a first width at a position close to the first portion and a second width smaller than the first width at a position away from the first portion.

16. The multilayer coil component according to claim 11, wherein the pad conductor includes:

a third portion continuous with the first portion, separated from the second portion, and having a third shortest distance from the coil that is larger than the first shortest distance, and a constriction located at a transition be the first portion and the third portion.

17. The multilayer coil component of claim 16, wherein in the third portion, the third shortest distance at least does not decrease with increasing a distance from the first portion.

18. The multilayer coil component of claim 16, wherein in the third portion, the third shortest distance at a position away from the first portion is larger than the third shortest distance at a position close to the first portion.

19. The multilayer coil component of claim 18, wherein the third shortest distance increases with increasing a distance from the first portion.

20. The multilayer coil component of claim 16, wherein the third portion has a third width at a position close to the first portion and has a fourth width smaller than the third width at a position away from the first portion.

* * * * *